(12) United States Patent
Jaiswal et al.

(10) Patent No.: US 8,295,468 B2
(45) Date of Patent: Oct. 23, 2012

(54) OPTIMIZED METHOD TO SELECT AND RETRIEVE A CONTACT CENTER TRANSACTION FROM A SET OF TRANSACTIONS STORED IN A QUEUING MECHANISM

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1089 days.

(21) Appl. No.: 12/201,365

(22) Filed: Aug. 29, 2008

(65) Prior Publication Data

US 2010/0054431 A1 Mar. 4, 2010

(51) Int. Cl.
 H04M 3/50 (2006.01)
 H04M 1/64 (2006.01)
 H04L 12/66 (2006.01)
 H04W 4/12 (2009.01)

(52) U.S. Cl. ........... 379/265.02; 370/352; 379/88.04; 379/201.03; 379/216.01; 379/221.02; 379/265.09; 455/466; 705/14.47; 705/14.54; 709/203; 709/217; 709/224; 715/753; 715/823; 717/173

(58) Field of Classification Search .......... 370/252, 370/352; 379/88.04, 201.03, 221.02, 265.02, 379/265.09, 216.01; 455/466; 705/14.54, 705/14.47; 709/217, 224, 203; 715/753; 715/823; 717/173
See application file for complete search history.

(56) References Cited

U.S. PATENT DOCUMENTS

| | | | |
|---|---|---|---|
| 6,385,646 B1 * | 5/2002 | Brown et al. | 709/217 |
| 6,654,457 B1 * | 11/2003 | Beddus et al. | 379/265.02 |
| 6,687,241 B1 * | 2/2004 | Goss | 370/352 |
| 6,820,260 B1 * | 11/2004 | Flockhart et al. | 717/173 |
| 6,965,870 B1 * | 11/2005 | Petras et al. | 705/14.54 |
| 7,330,887 B1 * | 2/2008 | Dharmadhikari | 709/224 |
| 7,617,457 B2 * | 11/2009 | Kortum et al. | 715/753 |
| 8,081,744 B2 * | 12/2011 | Sylvain | 379/201.03 |
| 2004/0240657 A1 * | 12/2004 | Camarillo | 379/221.02 |
| 2007/0101293 A1 * | 5/2007 | Cherry et al. | 715/823 |
| 2008/0152116 A1 * | 6/2008 | Sylvain | 379/216.01 |
| 2008/0267387 A1 * | 10/2008 | Strathmeyer et al. | 379/265.09 |
| 2009/0012853 A1 * | 1/2009 | Nolet et al. | 705/14 |
| 2009/0013031 A1 * | 1/2009 | Nolet et al. | 709/203 |
| 2009/0305731 A1 * | 12/2009 | Kim | 455/466 |
| 2010/0054148 A1 * | 3/2010 | Murakami et al. | 370/252 |
| 2010/0054431 A1 * | 3/2010 | Jaiswal et al. | 379/88.04 |
| 2010/0142516 A1 * | 6/2010 | Lawson et al. | 370/352 |

* cited by examiner

Primary Examiner — Gerald Gauthier
(74) Attorney, Agent, or Firm — John Pivnichny; Roberts Mlotkowski Safran & Cole, P.C.

(57) ABSTRACT

A system and method to select and retrieve contact center transactions from a set of transactions stored in a queuing mechanism. The system includes an interactive voice response system configured to accept at least one call and dynamically populate a web form with call data associated with the at least one call. The system also includes a queuing engine configured to allow a call agent to access the call data prior to the at least one call being connected to the call agent.

20 Claims, 4 Drawing Sheets

Queuing System 410

| Status | Unique ID | URL | Initiate Call | Monitor Call |
|---|---|---|---|---|
| Incomplete | ISH34811A | http://654.sdf457.com/caller1 | Initiate | ... |
| In Progress | 3448971 | http://654.sdf457.com/caller2 | | Monitor |
| Incomplete | 657AW246D5 | http://654.sdf457.com/caller3 | Initiate | ... |
| Complete | 6876SAF5 | http://654.sdf457.com/caller4 | ... | ... |
| Pending | 37711sw1 | http://654.sdf457.com/caller5 | Initiate | ... |
| ... | ... | ... | ... | ... |
| ↑ 420 | ↑ 430 | ↑ 440 | ↑ 450 | ↑ 460 |

FIG. 4

OPTIMIZED METHOD TO SELECT AND RETRIEVE A CONTACT CENTER TRANSACTION FROM A SET OF TRANSACTIONS STORED IN A QUEUING MECHANISM

FIELD OF THE INVENTION

The invention generally relates to a system and method for selecting and retrieving contact center transactions and, in particular, to selecting and retrieving contact center transactions from a set of transactions stored in a queuing mechanism.

BACKGROUND

Telephone call centers provide users with a mechanism to ascertain information about a product, service, etc., from qualified call agents. To make the process more effective, call centers often utilize computer telephony integration (CTI), which generally allow for some sort of an interactive voice response (IVR) mechanism coupled with a set of speech recognition servers and a routing framework. This allows a user to vocalize or otherwise input data about themselves, their problem, a command, etc.

The data gathered by the IVR and the routing framework can be collected in steps and attached to the call by CTI servers as a data structure. Once the data structure is attached to the call, the data structure can be passed through each hop of the call. Thus, for example, the data structure could be sent through the domain name or stations and one or more route points. After the call and attached data are routed to a call center, a call agent may answer the call in the order it is received and provide information to the user.

SUMMARY

In a first aspect of the invention, a system comprises an interactive voice response system configured to accept at least one call and dynamically populate a web form with call data associated with the at least one call. The system also comprises a queuing engine configured to allow a call agent to access the call data prior to the at least one call being connected to the call agent.

In another aspect of the invention, a computer implemented method for dynamically accessing call data associated with an incoming call comprises associating a unique identifier with an incoming call and associating a uniform resource locator (URL) to the unique identifier. The method further comprises storing the call data at the URL, wherein the URL and the call data are dynamically accessible by a call agent. Additionally, the method includes connecting the call agent to the incoming call.

In yet another aspect of the invention, a method for queuing calls comprises providing a computer infrastructure being operable to: associate call data with a URL; place the URL in a queue; permit the URL to be accessed independent from a position of the URL in the queue; and allow the call data to be dynamically viewed through the URL.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 4 shows an exemplary queuing system according to aspects of the invention.

DETAILED DESCRIPTION

Figure 1:
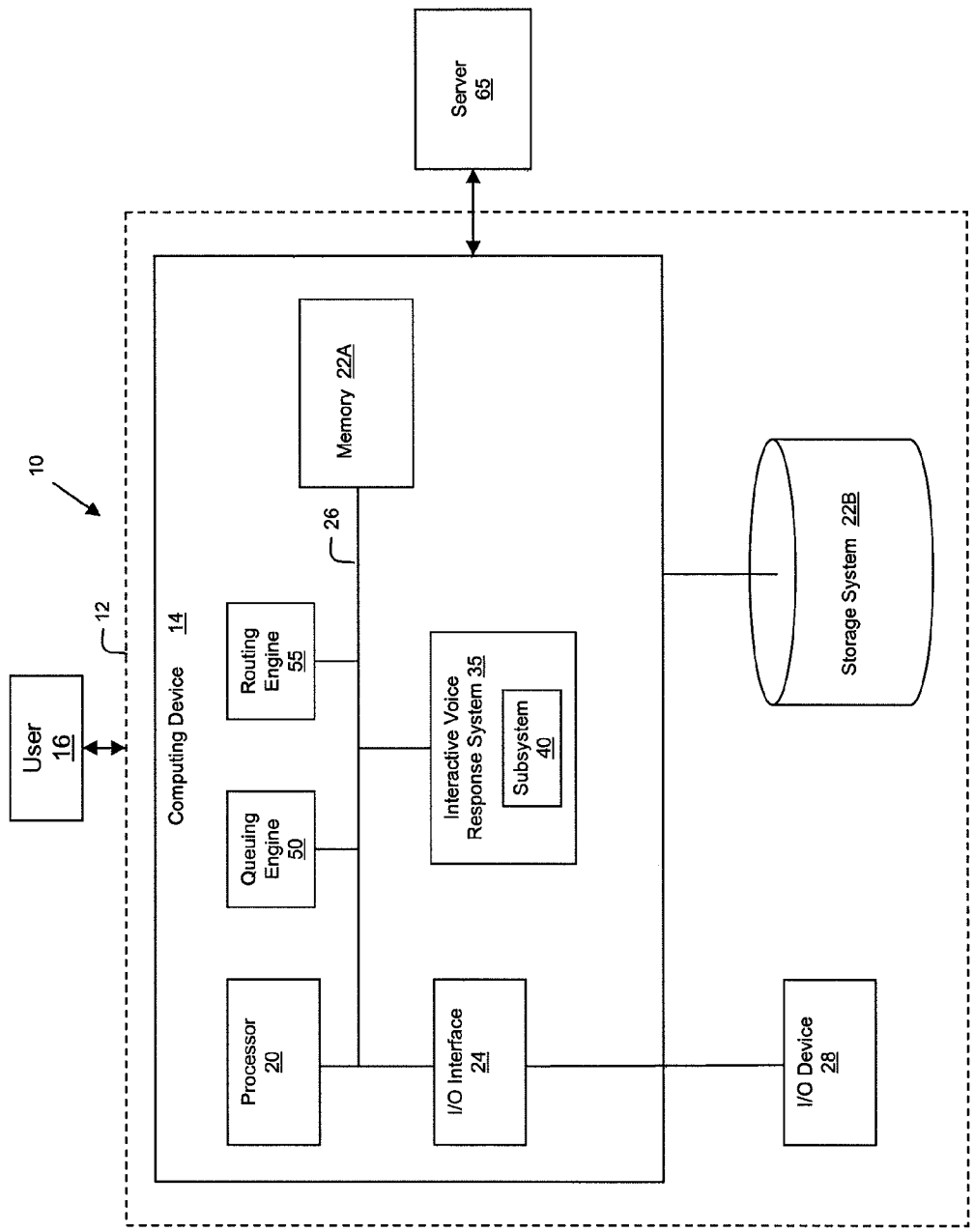
FIG. 1 shows an illustrative environment for implementing the steps in accordance with the invention.

The invention is directed to a system and method for selecting and retrieving contact center transactions and, in particular, to selecting and retrieving contact center transactions from a set of transactions stored in a queuing mechanism. More specifically, the invention associates a unique identifier (ID) to an incoming call. The unique ID may also be associated with a uniform resource locator (URL), which is a link to a webpage where data about the caller may be stored. Since call data is stored at the URL, instead of being attached to the call, there are no size or optimization issues as to how much data can be associated with the call. Moreover, as the unique ID is the only value attached to the incoming call, all of the other data associated with the call and/or caller may be handled by a web service.

One or more URLs may be stored in a queue. Call agents may access the queue in any order and dynamically select or pull a URL to view data about the call. Based on the call agent's review of the call data, the call agent may choose to download or connect to the caller waiting in the queue. Beneficially, this allows the call agent to acquire knowledge about the call prior to connecting to the caller and to determine how to handle the call so as to effectively and satisfactorily serve the caller.

In embodiments, the call agent may also connect to callers that were in the queue but have since hung up. This may be performed using a virtual hold, which allows the caller to maintain his or her position in the queue as well as any data that the caller may have entered. In embodiments, the caller may remain on virtual hold until the call agent calls back the caller. This beneficially allows callers to avoid long waits and also allows call agents to call back callers when the call agent is less busy and/or has had more time to review the call data.

Once the call agent and the caller are connected, the call can be monitored for quality. Additionally, in embodiments, a conference may be created by having one or more entities join an existing call. This allows entities to share resources and combine their knowledge to serve the caller.

Understandably, by using a website as described in the present invention, a call agent in one country can have access to the same data and the same call queue as a call agent in another country. This allows the routing logic to be simplified and completely eliminates dependency on CTI for the time taken to populate data to a call agent's workstation.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an Interactive Voice Response System (IVR) 35. The IVR 35 is configured to accept incoming calls, create a unique ID for the call, present prompts to the caller, attach data from the prompts to the call, etc. The IVR 35 may also dynamically populate and/or update a web form with data sent by one or more servers 65. In embodiments, this dynamic populating and/or updating may be performed by one or more IVR subsystems 40.

The computing device 14 may also comprise a Queuing Engine 50 configured to queue one or more incoming calls. The queue may be a priority queue, a first-in-first-out data structure, or any number of queuing data structures known to those of skill in the art. Moreover, in embodiments, the Queuing Engine 50 may also allow a call agent, supervisor, etc., to dynamically access one or more queued calls regardless of the order in which the call was received.

The computing device may further comprise a Routing Engine 55 configured to connect the caller and the call agent. In embodiments, the routing may be performed automatically without action from the caller or call agent. However, embodiments may require some action, such as a call agent affirmatively selecting a call.

Embodiments may also utilize the Routing Engine 55 to place outbound calls based on stored information from a previously obtained incoming call. For example, an incoming call may be placed in a queue, however, the call may be ended prior to the caller being connected to the call agent. In such cases, embodiments of the invention allow for the caller's place in the queue to be held and the data obtained by the IVR 35 to be stored, e.g., in storage system 22B. Using this data, the Routing Engine 55 may permit the call agent to place an outbound call to the caller without requiring the user to remain on hold for long periods of time. Understandably, by utilizing the IVR 35, Queuing Engine 50, and Routing Engine 55, the contact center transactions can be selected and retrieved from a set of transactions stored in a queuing mechanism in accordance with the invention, e.g., process described herein.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc. The storage system 22B can include an "inventory" of sounds, modifications, etc., which may be selected by the user's avatar.

In general, the processor 20 executes computer program code, which is stored in the memory 22A and/or storage system 22B. The computer code may be representable of the functionality of the IVR 35, Queuing Engine 50, and Routing Engine 55. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
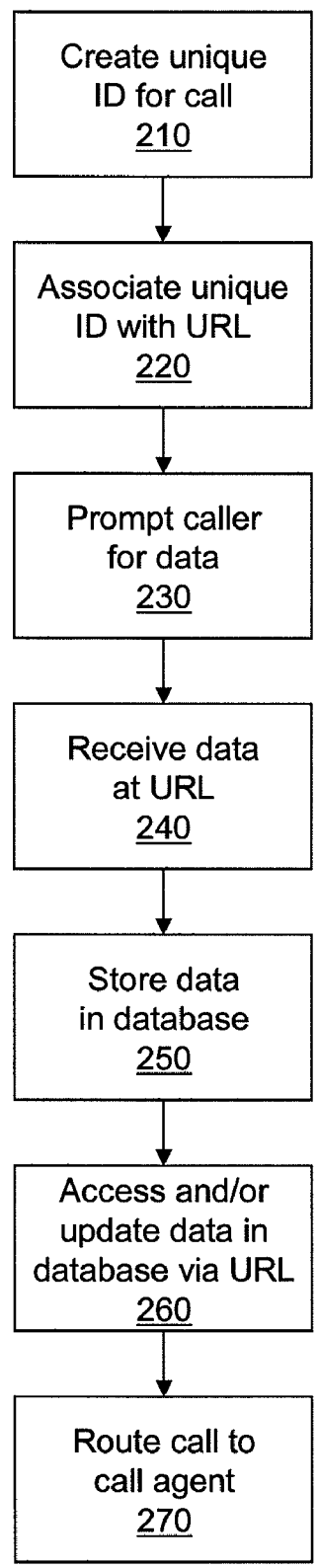
FIG. 2 shows a flow chart of an exemplary process in accordance with aspects of the invention.

FIG. 2 shows a flow chart of an exemplary process according to embodiments of the invention. In particular, FIG. 2 shows a plurality of steps that may be performed when a caller calls into an IVR system (e.g., IVR system 35 described with respect to FIG. 1) to obtain customer service. The incoming call may be associated or otherwise linked to the call via a unique identifier (ID), at step 210. In embodiments, this unique ID may be created by the IVR system and attached to the call using CTI.

At step 220, the unique ID may be associated with a URL. The URL is configured to provide a link to a web page having storage capabilities, such as a storage system (e.g., storage system 22B described with respect to FIG. 1). A webpage may be created for every incoming call once the call is received by the IVR system. However, rather then creating a new webpage for each incoming call, embodiments may use the same webpage each time a caller calls the call center.

At step 230, the IVR system prompts the caller for data. The type of data the caller enters at the prompt may include, e.g., the caller's phone number, the caller's address, the type of problem or inquiry the user has, who the user wants to speak with, etc. In embodiments, one or more pieces of information may be obtained automatically without a prompt. For example, the caller's phone number as well as information associated with the caller's phone number such as an address, account number, etc., may be obtained automatically upon identifying the incoming call.

It should be understood by those skilled in the art that the call does not carry any call data. Instead, the call data is sent to a webpage as a post request, which allows data to appear in the webpage as opposed to appearing in the URL. Any data fetch that occurs in the background as a result of this fetch is not attached to the call, rather, the running data structure for this call is updated.

At step 240, the call data may be received at the URL 240. At step 250, the call data received at step 240 may be stored using a storage system or database, which is associated with the URL. This may be performed, e.g., by the IVR system dynamically populating a web form associated with the URL. In embodiments, the call data or parts thereof may be encrypted using, e.g., secure transaction technologies. This ensures that confidential and/or sensitive information is secured before the call data is sent to the URL or otherwise placed on a server.

Call data may be accessed, updated, deleted, added, etc., by sending post requests to dynamically update a URL, at step 260. In embodiments, a plurality of call agents, entities, etc., may simultaneously access the call data. Embodiments may restrict the ability to access, update, delete, add, etc., call data based on permissions and/or call data type. For example, secure information, such as a caller's social security number, credit card number, etc., may be restricted as confidential and may not be accessed, updated, deleted, added, etc., without clearance. Moreover, in embodiments, access to call data may be limited to certain departments within a call center, such as a service department, to ensure that access to personal and/or confidential call data is minimized.

At step 270, a call may be routed to a call agent by the Routing Engine 55 using any number of routing mechanisms known to those of skill in the art. In embodiments, the routing may occur automatically or upon the happening of an event, such as selecting a call from a queue. For example, a Queuing Engine 50 may create a queue of URL's that the call agent may use to access and view call data and the complexity of the call. Upon viewing the call data, the call agent may decide to download or connect to the call by having the Routing Engine 55 deliver the queued call to the call agent. In embodiments, the call agent may have autonomy to choose which calls to connect to; however, embodiments may limit and/or otherwise restrict this autonomy based on any one or more parameters relating to business, efficiency, importance, etc.

While the steps in FIG. 2 are presented in a certain sequence, it should be understood that this sequence is illustrative and that it should not be construed as limiting the invention. Moreover, while a number of steps have been discussed in reference to FIG. 2, it should be understood by those of skill in the art that embodiments may employ more or fewer steps than those discussed in FIG. 2. For example, embodiments may include additional steps such as allowing a supervisor to monitor the call between the caller and the call agent. Additionally, embodiments may allow the call agent to place an outgoing call to a caller based on, e.g., the call data at the URL.

Further embodiments may attach a score to the number of calls and/or the difficulty of the calls that are handled by the call agent. The score may be determined using any number of business rules and may be used, e.g., to track the productivity of the call agent. In embodiments, the scores may be adjusted to add an incentive for call agents to connect to incoming calls and/or place outgoing calls.

Figure 3:
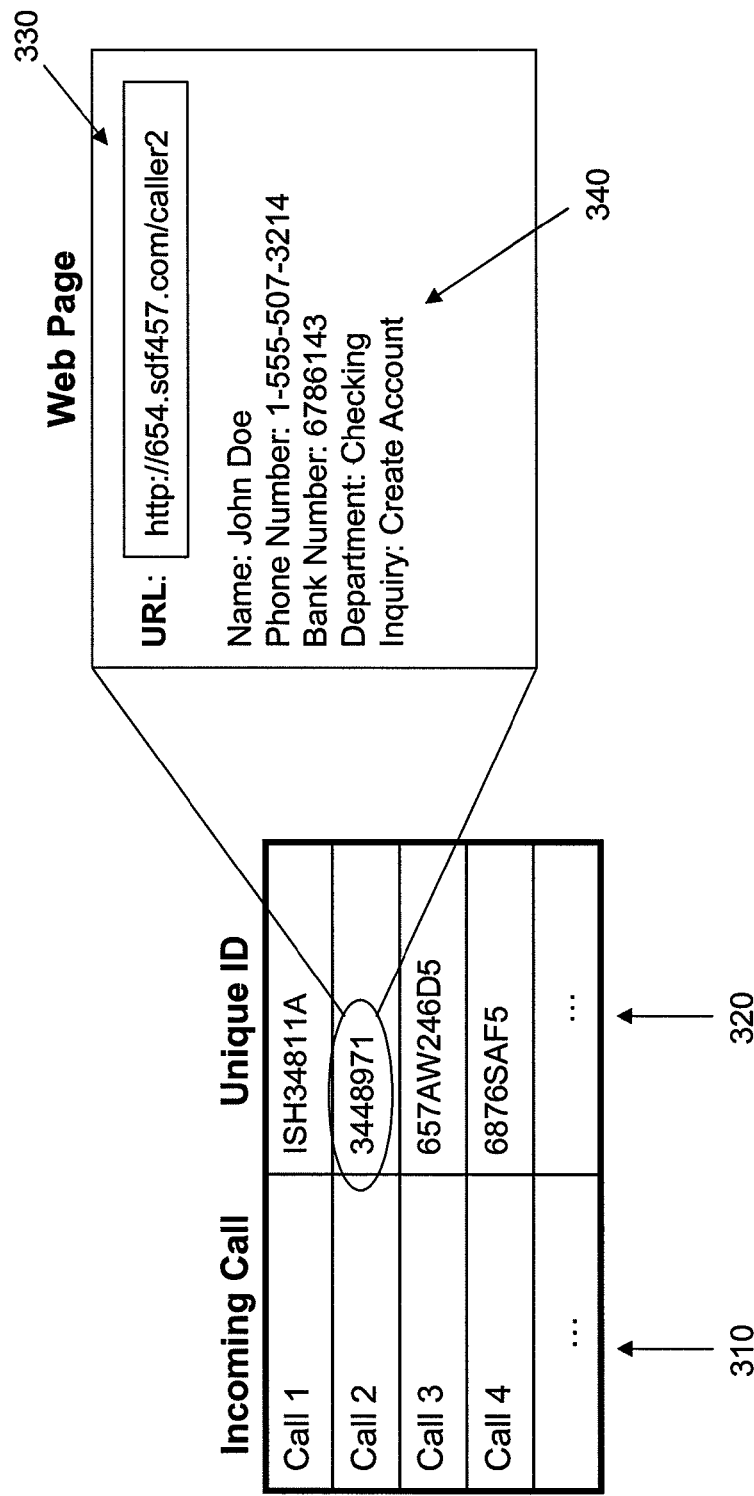
FIG. 3 shows an exemplary illustration of how call data may be associated with a call in accordance with aspects of the invention.

FIG. 3 is an exemplary illustration of how call data may be associated with a call in accordance with embodiments of the invention. In particular, FIG. 3 includes a plurality of incoming calls, in column 310. Each of these incoming calls may be associated with a unique ID, as illustrated at column 320. The unique ID may be associated with a webpage page via a URL 330. The data stored at the URL 330 may include call data 340 collected from the caller via one or more prompts. In embodiments, the call data 340 may also include data collected automatically from the caller.

For example, a caller may call into a call center to obtain help creating a checking account. The incoming call may be illustrated as "Call 2". This call may be associated with unique ID "3448971", which uniquely identifies "Call 2". The unique ID may also be associated with a URL "http://654.sdf457.com/caller2", which comprises data about the call and/or caller. The call data may include, e.g., that the caller's name is "John Doe", his phone number is "1-555-507-3214", his bank number is "6786143", he wants to speak with a call agent from the checking account department, and the caller would like to create an account, etc. The invention is not limited to this data; rather, any suitable data may be associated with a URL in accordance with aspects of the invention. In embodiments, the call agent may view the call data while the call is queued by the Queuing Engine 50 so that the call agent knows who the caller is, the purpose of the call, etc. Beneficially, this allows the call agent to be prepared to help the caller with problems, provide the user with information, etc.

FIG. 4 shows an exemplary queuing system in accordance with embodiments of the invention. More specifically, FIG. 4 includes a website or webpage 410. The website 410 may include a queue of incoming calls. Each incoming call can have a status associated with the call, as illustrated in column 420. The status may indicate whether the call is inactive, i.e., the call was ended prior to speaking with a call agent. The status may also indicate that the call is in progress, i.e., the caller is speaking with the call agent. Moreover, status indicators may be used to indicate that a call is pending, i.e., the caller is waiting to speak with a call agent. Additionally, the status may indicate that the call is complete, i.e., the caller has finished speaking with a call agent. In embodiments, a complete status may also indicate that a ticket, which may have been opened and associated with the call, has been closed. The status indicators that have been described herein are merely illustrative and should not be construed as to limit the invention.

In addition to providing the status of an incoming call, the queue may also include the unique ID that is associated with the incoming call, at column 430. The unique ID may include, but is not limited to: alpha-numeric, symbols, etc. The queue may also include the URL, which is associated with the unique ID, at column 440. As explained herein, the URL stores call data associated with a call, which may be accessed by a call agent prior to and/or after connecting to the incoming call.

In embodiments, the call agent may be permitted to initiate an outbound call, at column 450. Outbound calls may be performed on demand when a call agent downloads or connects to a queued call that is inactive. For example, an outbound call may be made by the system to inactive callers who indicate a preference that a call agent return their call. Embodiments may also permit outbound calls on, e.g., open tickets that need follow up work. Beneficially, this mechanism maintains the caller's position in the queue as well as the caller's corresponding data so that the caller does not have to wait in the queue to get routed.

An administrator, supervisor, or other user with the appropriate access rights may monitor calls, at column 460. The monitoring may be through the same website that is used by call agents or a variation thereof. For example, the monitoring may be through a specified monitoring website, which permits the administrator, supervisor, or other user to look into the call data that is being dynamically populated into the web form by the IVR system. Moreover, it allows the administrator, supervisor, or other user to select an in progress call and listen in on the call, i.e., as a call in. In embodiments, the selection may be performed by clicking a link, vocalizing and/or entering a command, etc. Beneficially, this allows the quality of the call agent to be monitored.

Exemplary Embodiments

In an exemplary embodiment, a caller calls into an IVR system to obtain customer service, the call is received, the IVR system creates a unique ID for the calls and uses CTI to attach the unique ID to the call. The IVR system may also be used to present one or more prompts to the caller, which the caller may respond to by entering call data. According to aspects of the invention, entered call data is stored in a database against the unique ID. In embodiments, the process of populating or storing the call data into the database may be performed by the IVR system or a subsystem thereof. The stored call data may be exposed using a URL and, in embodiments, the call data may also be updated using the URL.

Once entered, or optionally before the entering process is complete, the call may be placed into a queue and/or routed to a call agent. In embodiments, an agent application (e.g., a program that runs on the call agent's computer) can be used to retrieve the call data associated with the incoming call via the URL. If, for example, the call agent does not get to the call before the caller hangs up, the caller's place in the queue may be held along with a request that a call agent call the caller back when a call agent is available. Thus, when there is a low volume of calls and/or the call agent has no calls, the call agent may browse the queue via, e.g., an intranet website to see how many incomplete or pending transactions exist in the queue. The call agent may also view call data associated with one or more of the queued calls, such as the type of call, call parameters, etc., and request that the call be routed to him or her. The connection may be performed, e.g., by having a routing engine place an outbound call to the user.

As calls are routed through a website and call data is stored on the website, it is possible to update calls and/or call data and have the updates reflected on the website. For example, the website may be updated to reflect changes to call data such as, e.g., the call type, one or more call parameters, the call status, etc. Additionally, the website may be used, e.g., by an administrator or supervisor to monitor what calls are currently in progress as well as what calls are currently pending.

In embodiments, the administrator or supervisor may select to listen to a currently pending call by prompting CTI to conference in the supervisor with the caller and the call agent. The conference feature allows multiple call agents, supervisors, callers, etc., to share in co-existing transactions without considerable integration and programming. Moreover, as updates are carried on at the URL, sharing data in conferences may be carried out on a server instead of locally. Understandably, this allows data to be easily accessed and used by the parties in the conference.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system comprising:
    a computing device comprising an interactive voice response system, a queuing engine, and a routing engine, wherein the computing device is configured to:
        accept at least one call and dynamically populate a web form with call data associated with the at least one call;
        associate the at least one call with a unique identifier;
        associate the unique identifier with a uniform resource locator (URL) associated with the web form; and
        create a queue including the unique identifier and the URL and a plurality of other unique identifiers and URLs associated with a plurality of other calls;
    wherein the queuing engine is configured to allow a call agent to view the call data via the URL prior to the at least one call being connected to the call agent;
    the queue is included in a website; and
    the queue includes a respective status of the at least one call and of the plurality of other calls.

2. The system of claim 1, wherein:
    the interactive voice response system uses computer telephony integration (CTI) to attach the unique identifier to the at least one call; and
    the call data is stored in a storage system against the unique identifier.

3. The system of claim 1, wherein the call agent dynamically selects the at least one call from the queue.

4. The system of claim 1, wherein the routing engine is configured to connect the call agent to the at least one call, and to create a conference call by connecting the call agent and a caller to one or more entities.

5. A computer implemented method for dynamically accessing call data associated with an incoming call, comprising:
    associating a unique identifier with the incoming call;
    associating a uniform resource locator (URL) to the unique identifier;
    storing the call data at the URL, wherein the URL and the call data are dynamically accessible by a call agent;
    connecting the call agent to the incoming call; and
    creating a conference call between the call agent, the incoming call, and one or more entities.

6. The computer implemented method of claim 5, further comprising monitoring a communication between the call agent and the incoming call.

7. The computer implemented method of claim 5, wherein the call data is encrypted.

8. The computer implemented method of claim 5, further comprising placing the incoming call on a virtual hold.

9. The computer implemented method of claim 5, wherein a service provider at least one of creates, maintains, deploys, and supports a computer infrastructure that performs at least one of the steps of claim 8.

10. The computer implemented method of claim 5, wherein the steps of claim 6 are offered by a service provider based on one of a fee and subscription basis.

11. The computer implemented method of claim 5, further comprising:
    creating the unique identifier for the incoming call;
    prompting a caller for the call data, wherein the call data is dynamically accessible by the call agent via a queue; and permitting the call data to be one or more of accessed, revised, deleted, and added.

12. A method for deploying an application for queuing calls, comprising:
   providing a computer infrastructure being operable to:
      associate call data with a URL;
      place the URL in a queue;
      permit the URL to be accessed independent from a position of the URL in the queue; and
      allow the call data to be dynamically viewed through the URL.

13. The method of claim 12, wherein the computer infrastructure is further operable to obtain the call data automatically.

14. The method of claim 12, wherein the computer infrastructure is further operable to route a call associated with the call data to a call agent after the call data is dynamically viewed.

15. The method of claim 12, wherein the URL is associated with a call via a unique ID.

16. The method of claim 12, wherein the call data is simultaneously viewable by a plurality of call agents.

17. The method of claim 12, wherein the computer infrastructure is at least one of supported, deployed, maintained, and created by a service provider.

18. The method of claim 12, wherein the computer infrastructure is further operable to:
   associate a call with a unique identifier;
   associate the unique identifier with the URL;
   obtain the call data;
   queue the URL for access by a call agent; and
   route the call to the call agent.

19. The method of claim 18, wherein:
   the queue includes the URL, the unique identifier, and a status associated with the call;
   the queue includes a plurality of other URLs, unique identifiers, and statuses associated with a plurality of other calls; and
   the queue is included and presented in a website.

20. The method of claim 19, wherein:
   the website permits the call agent to view the call data through the URL prior to the routing the call to the call agent; and
   the website is updated to reflect changes to the call data.

* * * * *